United States Patent [19]

Teramachi

[11] Patent Number: 4,547,024
[45] Date of Patent: Oct. 15, 1985

[54] CROSS-LINEAR SLIDE BEARING HAVING REDUCED THICKNESS FOR USE IN X-Y TABLE

[76] Inventor: Hiroshi Teramachi, 2-34-8, Higashi-Tamagawa, Setagaya-ku, Tokyo, Japan

[21] Appl. No.: 652,899

[22] Filed: Sep. 21, 1984

[30] Foreign Application Priority Data

Sep. 27, 1983 [JP] Japan ................. 58-177010

[51] Int. Cl.$^4$ ............................. F16C 29/06
[52] U.S. Cl. ................................ 308/6 C
[58] Field of Search .......... 308/3 R, 3 A, 6 R, 6 C; 33/1 M; 74/471 XY; 108/143

[56] References Cited

U.S. PATENT DOCUMENTS

| | | | |
|---|---|---|---|
| 2,681,836 | 6/1954 | Jarund | 308/6 C |
| 3,450,447 | 6/1969 | Hacker | 308/6 R |
| 4,118,101 | 10/1978 | Teramachi | 308/6 C |
| 4,205,886 | 6/1980 | Teramachi | 308/6 R X |

Primary Examiner—Stuart S. Levy
Assistant Examiner—David Werner
Attorney, Agent, or Firm—Kenyon & Kenyon

[57] ABSTRACT

A cross-linear slide bearing having a reduced thickness for use in an X-Y table includes a pair of first track rails which are disposed on a securing part such as to be in parallel to each other and are respectively provided in the opposing inner surfaces thereof with loaded ball rolling grooves extending longitudinally, and a pair of second track rails which are attached to a movable table such as to be in parallel to each other and to cross the first track rails at right angles and are provided in the opposing inner surfaces thereof with loaded ball rolling grooves extending longitudinally. The cross-linear slide bearing further includes four bearing units which are respectively disposed at intersections between the first and second track rails and are adapted to linearly move relative to the corresponding track rails. Each of the bearing units includes a flat bearing body having a pair of outer side surfaces which are adjacent to each other at 90 degrees. The bearing body further has first and second loaded ball rolling grooves which are respectively formed in the adjacent outer side surfaces such as to face the corresponding loaded ball rolling grooves on the first and second track rails and such as to be separate from each other vertically.

5 Claims, 20 Drawing Figures

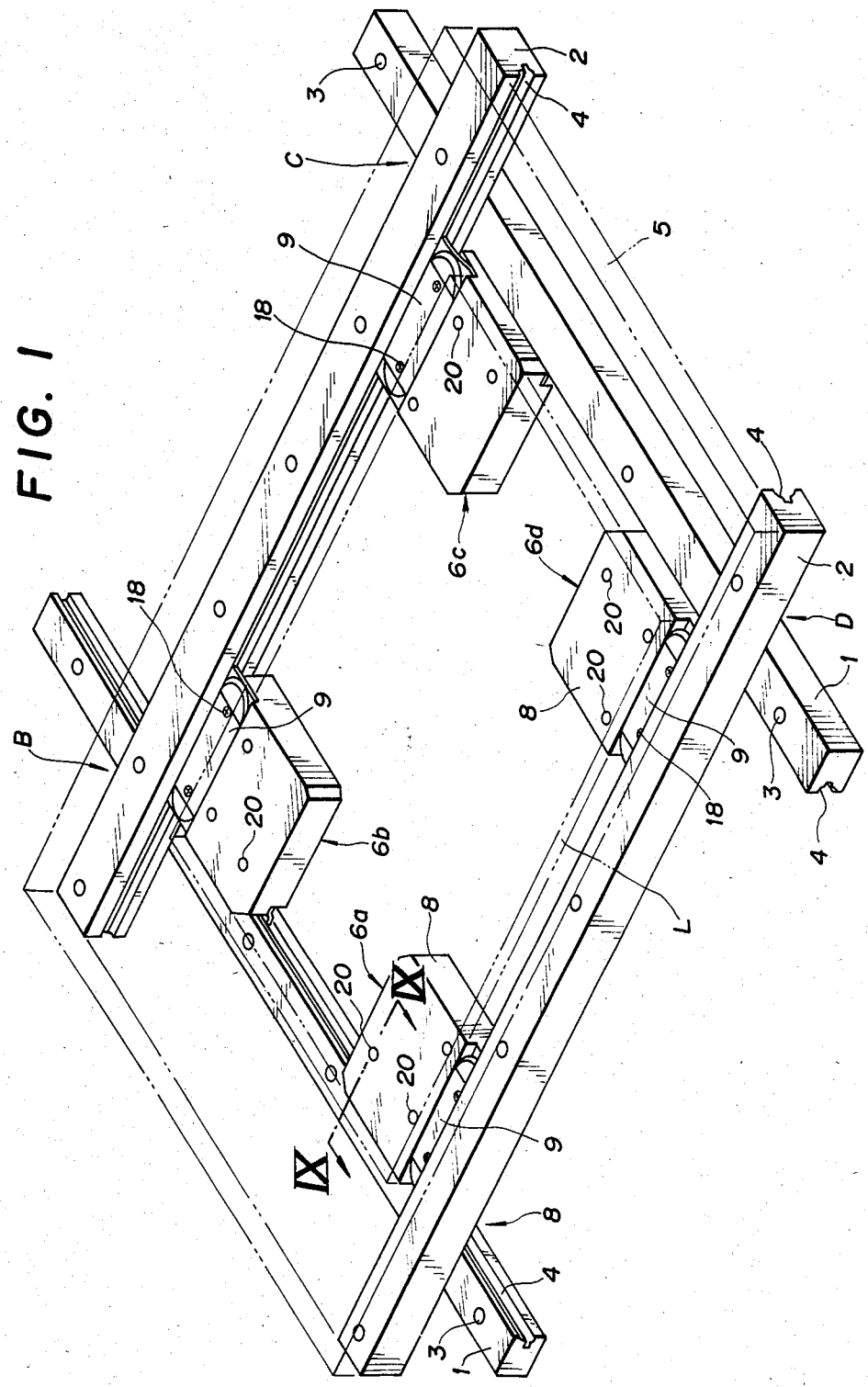

CROSS-LINEAR SLIDE BEARING HAVING REDUCED THICKNESS FOR USE IN X-Y TABLE

BACKGROUND OF THE INVENTION

1. Field of the Invention

The present invention relates to a cross-linear slide bearing for use in an X-Y table which is capable of linearly sliding an object to be slid in directions crossing each other.

2. Description of the Prior Art

The above-described cross-linear slide bearing is employed to linearly slide a table having an object to be slid (for example, a machine tool) mounted thereon in directions which are orthogonal to each other and to accurately move such object to a predetermined position within a given plane.

An example of a conventional bearing of the type described above is mentioned in the specification of Japanese Patent Publication No. 32,888/1979. The conventional cross-linear slide bearing is arranged as follows: A thick-walled bearing body is provided on the upper and lower surfaces thereof with recesses for respectively receiving track rails, the recesses extending in directions crossing each other. Each track rail is provided on each of the shoulder portions thereof with two loaded ball rolling grooves extending longitudinally. Further, each of the recesses for receiving the track rails is fitted therein with a multiplicity of loaded balls which roll along the loaded ball rolling grooves, the balls being allowed to recirculate in two rows on each of the right and left sides of the recess.

The above-described conventional cross-linear slide bearing, however, encounters the following problems: Since the bearing body has a large wall thickness and moreover it is fitted at its upper and lower surfaces with the track rails, the apparatus as a whole is unfavorably increased in height. Consequently, when the bearing is incorporated in an X-Y table, there is a need for an inconveniently large mounting space in the vertical direction, and it is not possible to obtain a satisfactory stability. Further, since four rows of loaded balls roll and recirculate within each recess, it is disadvantageously necessary to reduce the radius of curvature of a ball turning portion at each of the longitudinal ends of the loaded ball rolling passages, which makes it difficult for the balls to roll smoothly. In addition, since the loaded ball rolling passages are cut inside the recess in order to fit the ball therein, an inconveniently large amount of labor is required for machining and assembling operations, resulting in an increase in production cost. Furthermore, since the bearing body has a large wall thickness, the weight of the bearing as a whole is increased correspondingly, which disadvantageously involves a correspondingly large inertia force.

SUMMARY OF THE INVENTION

In view of the above-described problems with the prior art, it is a primary object of the present invention to provide a compact and lightweight cross-linear slide bearing having a reduced thickness for use in an X-Y table in which the bearing body is reduced in wall thickness so that it is possible to reduce the weight of the bearing unit as a whole, to minimize inertia force, and to lower the height of the bearing as a whole to the utmost extent, and in which the loaded balls are allowed to run smoothly, and additionally machining and assembling efficiencies are improved, thus enabling a reduction in production cost To this end, according to the present invention, there is provided a cross-linear slide bearing having a reduced thickness for use in an X-Y table comprising: a pair of first track rails which are disposed on a securing part such as to be in parallel to each other and are respectively provided in the opposing inner surfaces thereof with loaded ball rolling grooves extending longitudinally; a pair of second track rails which are attached to a movable table such as to be in parallel to each other and to cross the first track rails at right angles and are provided in the opposing inner surfaces thereof with loaded ball rolling grooves extending longitudinally; and four bearing units which are respectively disposed at intersections between the first and second track rails and are adapted to linearly move relative to the corresponding track rails, wherein each of the bearing units is composed of: a flat bearing body having a pair of outer side surfaces which are adjacent to each other at 90 degrees, the bearing body having first and second loaded ball rolling grooves which are respectively formed in the adjacent outer side surfaces such as to face the corresponding loaded ball rolling grooves on the first and second track rails and such as to be separate from each other vertically, the bearing body further having a non-loaded ball rolling groove which is provided horizontally inward of each of the first and second loaded ball rolling grooves and is connected to the corresponding loaded ball rolling groove, thereby forming an endless ball rolling passage for recirculating balls; a multiplicity of balls disposed within the endless ball rolling passage; and a ball retainer which is attached to the bearing body and is adapted to rollably retain the balls within the non-loaded ball rolling groove.

By the virtue of the above-described arrangement, the following advantageous effects are offered:

Each of the bearing units supports the crossing track rails at a pair of orthogonal outer side surfaces thereof rather than by the upper and lower surfaces of the bearing unit. It is therefore possible to reduce the wall thickness of the bearing unit and to dispose the track rails such that they are in close proximity to each other in the vertical direction. Accordingly, it is possible to lower, to the utmost extent, the position of the X-Y table which is supported by the bearing units such as to be slidable in the forward and backward as well as rightward and leftward directions, whereby the stability of the X-Y table is improved.

Further, since it is possible to reduce the wall thickness of each bearing unit, the weight of the bearing unit is reduced correspondingly, whereby it is possible to minimize inertia force produced when the bearing unit moves in the forward and backward as well as rightward and leftward directions. Accordingly, it is possible to remarkably increase the accuracy of feeding the X-Y table.

Further, the loaded balls are adapted to recirculate while rolling along each of the loaded ball rolling grooves respectively provided on the adjacent outer side surfaces of each bearing unit and along the non-loaded ball rolling groove provided horizontally inward of the loaded ball rolling groove. For this reason, it is possible to form the curved portion between these rolling grooves such that it has a large radius of curvature, whereby the loaded balls are allowed to turn smoothly at the curved portion. In addition, since both the rolling grooves are formed in a horizontal plane, there is no effect of gravitational force on the loaded balls recirculating through the rolling grooves while rolling thereon, thus enabling the loaded balls to roll and recirculate in a very smooth manner. Furthermore, since the loaded ball rolling grooves are respectively provided on the adjacent outer side surface of each bearing unit and the non-loaded ball rolling grooves are respectively provided horizontally inward of the corresponding loaded ball rolling grooves, it is possible to relatively easily form these rolling grooves on the bearing unit by turning and grinding operations carried out from the outside thereof. Thus, it is possible to improve the machining and assembling efficiencies, whereby the production cost can be reduced. It is to be noted that, since each bearing unit is equipped with the ball retainer which retains the loaded balls such that they are able to roll and recirculate, there is no possibility that the loaded balls may fall off even in the state wherein the bearing unit is removed from the track rails, whereby it is possible to easily assemble the bearing unit and to fit the same to the track rails.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a perspective view of one embodiment of the cross-linear slide bearing having a reduced thickness ror use in an X-Y table in accordance with the present invention, showing the external appearance thereof in an operative state;

DESCRIPTION OF THE PREFERRED EMBODIMENT

The present invention will be described hereinunder in detail through an embodiment with reference to the accompanying drawings.

Figure 2A:
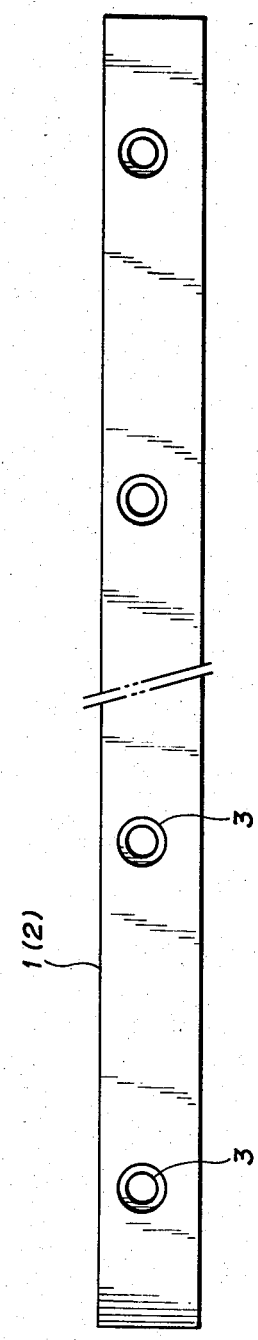
FIG. 2(a) is a plan view of a track rail employed in the cross-linear slide bearing shown in FIG. 1.
Figure 2B:
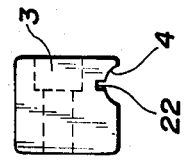
FIG. 2(b) is a side elevational view of the track rail shown in FIG. 2(a)
Figure 7C:
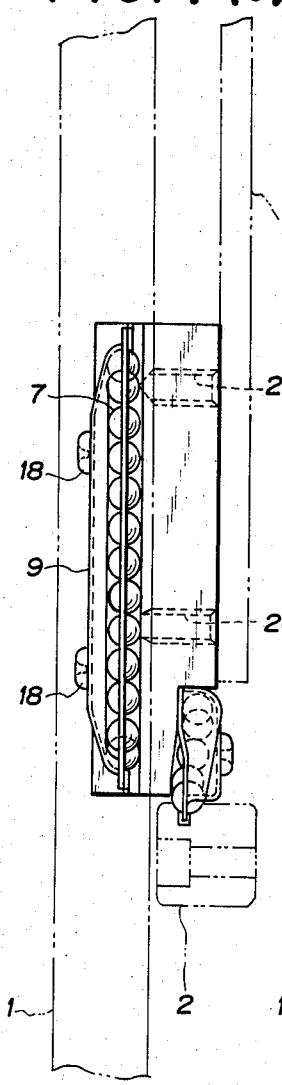
FIG. 7(c) is a side elevational view of the essential part shown in FIG. 7(a)
Figure 7A:
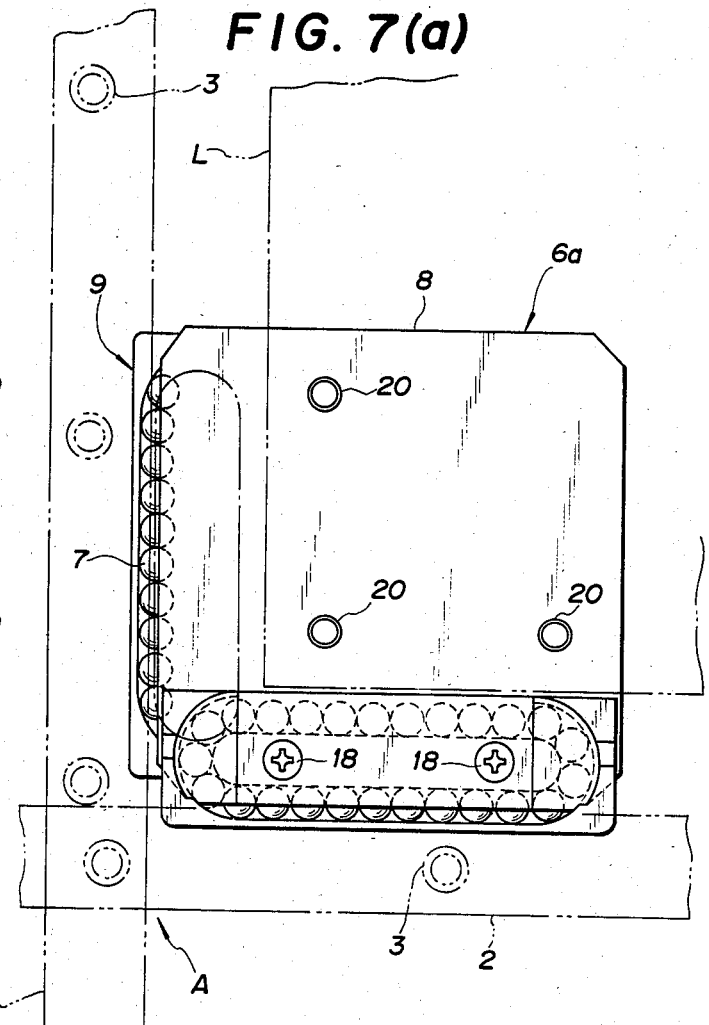
FIG. 7(a) is a plan view of an essential part of the cross-linear slide bearing shown in FIG. 1, particularly showing the part A thereof and its vicinity.
Figure 7B:
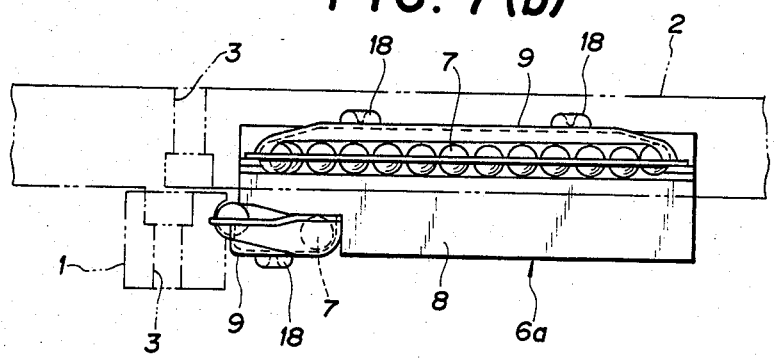
FIG. 7(b) is a front elevational view of the essential part shown in FIG. 7(a)
Figure 8:
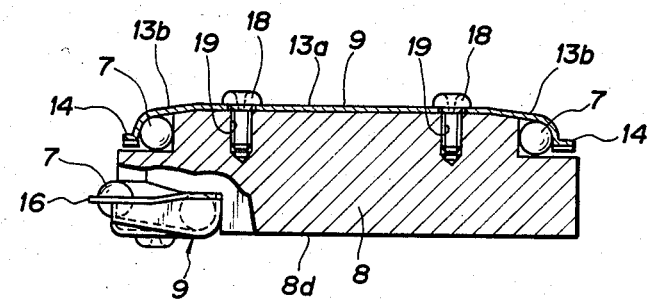
FIG. 8 is a sectional view taken along the line VIII—VIII of FIG. 3(a)
Figure 9:
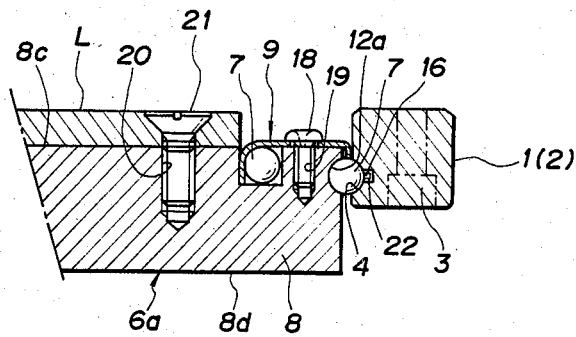
FIG. 9 is a sectional view taken along the line IX—IX of FIG. 1.

Referring first to FIG. 1, pairs of parallel track rails 1, 1 and 2, 2 are disposed such as to cross each other at right angles. Each of the track rails 1, 1, 2, 2 has, as shown in FIG. 2, mounting bores 3, 3 . . . formed in the longitudinal direction thereof at a predetermined spacing. Each track rail is further provided in its inner surface with a loaded ball rolling groove 4 of a substantially semicircular cross-section in the longitudinal direction thereof. A pair of track rails 1, 1 are disposed in parallel with a predetermined distance therebetween such that the respective loaded ball rolling grooves 4, 4 face each other. The track rails 1, 1 are secured to the mounting surface (not shown) of, for example, a bed, by means of fixing members (not shown), such as screws, which are respectively received through the mounting bores 3, 3 . . . On the other hand, a pair of track rails 2, 2 are disposed in parallel with a predetermined distance therebetween such that the respective loaded ball rolling grooves 4, 4 face each other. The track rails 2, 2 are secured to the reverse surface of an X-Y table 5 to which is mounted an object to be slid (not shown), such as a machine tool, by means of fixing members (not shown), such as screws, which are respectively received through the mounting bores 3, 3 . . . In this case, the track rails 2, 2 are disposed in inverted relation to the track rails 1, 1. The pairs of track rails 1, 1 and 2, 2 are, as clearly shown in FIG. 7(b), disposed such as to cross each other at right angles while being close to each other to such an extent that they almost contact each other.

Figure 3A:
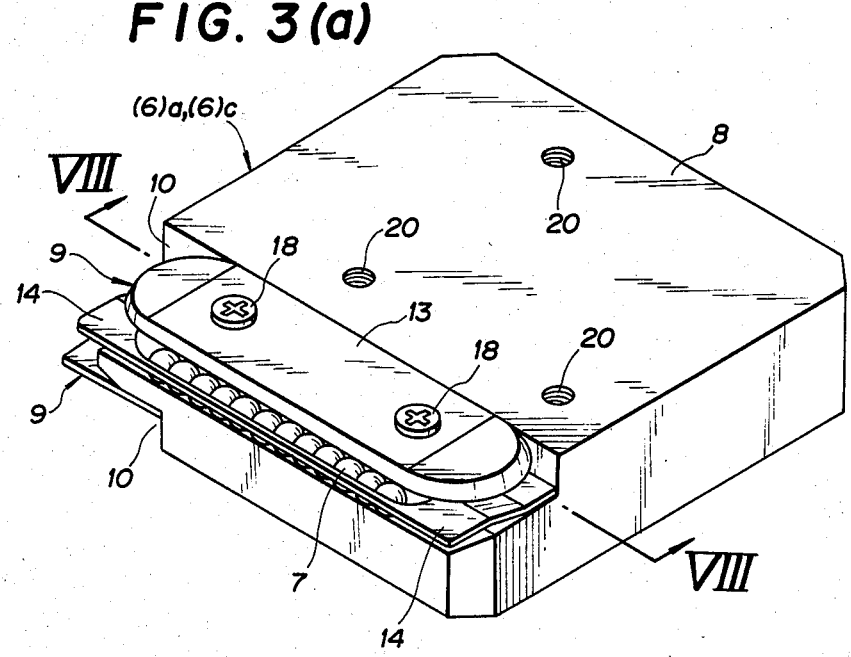
FIGS. 3(a) and 3(b) are perspective views of bearing units employed in the cross-linear slide bearing shown in FIG. 1 which are different in mounting position from each other.
Figure 3B:
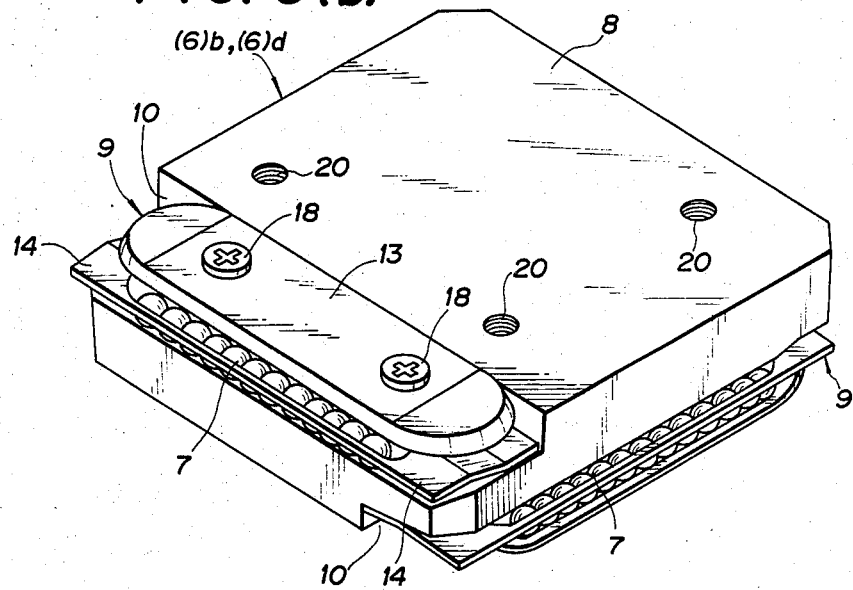

Four bearing units 6a, 6b, 6c, 6d are respectively disposed inside intersections A, B, C, D between the track rails 1, 1 and 2, 2. The bearing units 6a, 6b, 6c, 6d are respectively mounted in the four corners of a connecting plate L of a rectangular shape in plan. Each of these bearing units 6a, 6b, 6c, 6d is fitted at the adjacent outer side surfaces thereof with a plurality of loaded balls 7, 7 . . . which roll along the loaded ball rolling grooves 4, 4 . . . of the track rails 1, 1, 2, 2 such that the loaded balls 7, 7 . . . are able to recirculate as desired. The bearing units 6a, 6b, 6c, 6d are classed into those of the type such as that shown in FIG. 3(a) and those of the type such as that shown in FIG. 3(b) according to their mounting positions. The bearing units 6a, 6c are formed as shown in FIG. 3(a), while the bearing units 6b, 6d are formed as shown in FIG. 3(b). However, these two types of bearing units have essentially the same construction, differing from each other only in respect to the position for fitting the loaded balls 7, 7 . . . ; therefore, only a bearing unit of the type shown in FIG. 3(a) will be explained hereinunder.

The bearing unit 6 is composed of a bearing body 8 constituted by a plate-like block body having a substantially square shape in plan, and a ball retainer 9 which is fitted into the bearing body 8 and retains the loaded balls 7, 7 . . . such that they are able to recirculate while rolling.

Figure 4:
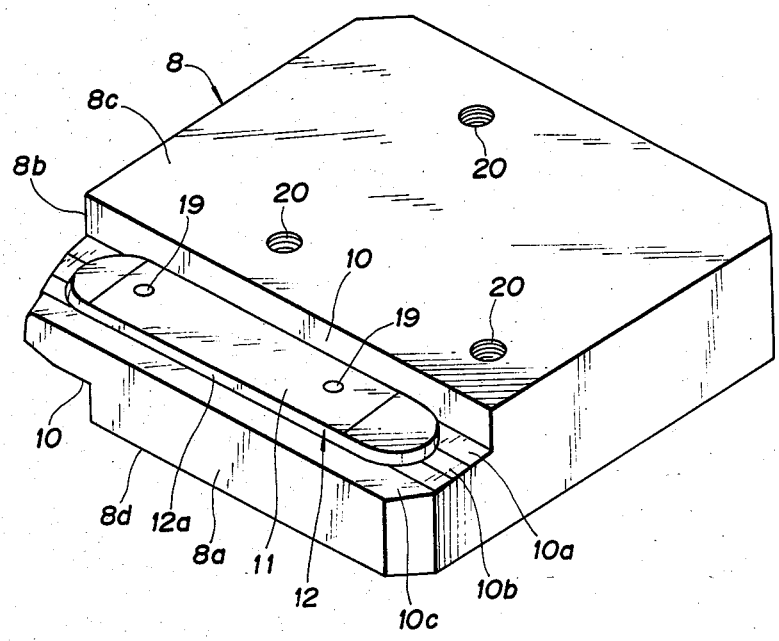
FIG. 4 is a perspective view of the bearing body of one bearing unit.

As shown in FIGS. 4 and 5, recesses 10, 10 are respectively provided over the regions on the upper and lower surfaces 8c, 8d of the bearing body 8 along the adjacent outer side surfaces 8a, 8b thereof such as to be respectively located on the upper and lower sides of the bearing body 8. A ridge 11 of a substantially track shape (an elliptical shape) in plan is integrally provided on the bottom surface of each recess 10. The ridge 11 is formed on the outer periphery thereof with an endless ball rolling passage 12 through which the loaded balls 7 recirculate while rolling.

Figure 5A:
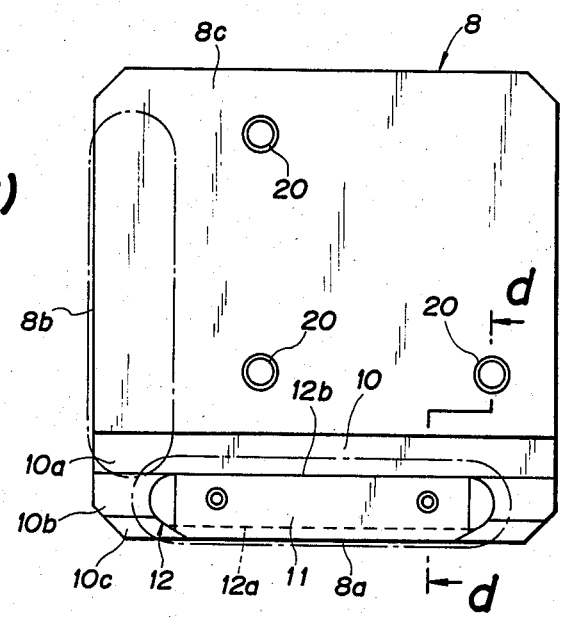
FIG. 5(a) is a plan view of the bearing body shown in FIG. 4.
Figure 5B:
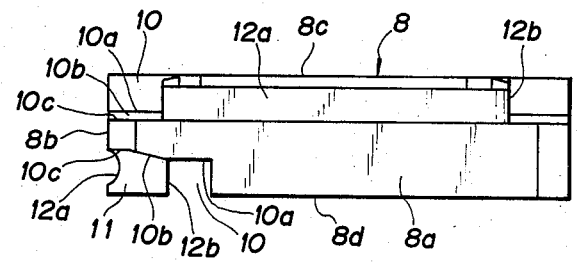
FIG. 5(b) is a front elevational view of the bearing body shown in FIG. 4.
Figure 5C:
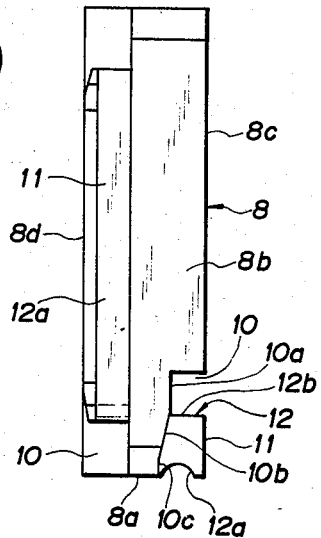
FIG. 5(c) is a side elevational view of the bearing body shown in FIG. 4.
Figure 5D:
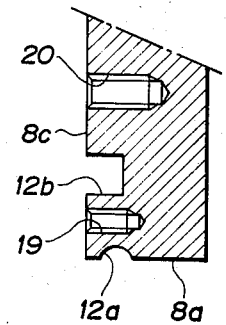
FIG. 5(d) is a sectional view taken along the line d—d of FIG. 5(a)

The outer side surface portion of the endless ball rolling groove 12, that is, a loaded ball rolling groove 12a serving as a ball rolling groove on the bearing body 8 when the loaded balls 7, 7 . . . roll along the respective loaded ball rolling grooves 4, 4 . . . of the track rails 1, 1, 2, 2, is formed into a substantially semicircular shape in cross-section as clearly shown in FIG. 5(d). On the other hand, the surface portion of the endless ball rolling passage 12 other than that serving as the loaded ball rolling groove 12a, that is, a non-loaded ball rolling groove 12b, is formed such as to be flat as clearly shown in FIGS. 5(b) and 5(c).

Further, the loaded ball rolling groove 12a is, as shown in FIGS. 5(b) and 5(c), located slightly lower than the linear portion of the non-loaded ball rolling groove 12b on the opposite side. For this purpose, the bottom surface of each of the recesses 10, 10 is composed of a higher portion 10a, a slanted portion 10b and a lower portion 10c, from the inner side toward the outer side of the bearing body 8.

The ball retainer 9 is, as shown in FIG. 6, composed of a dome-like retainer part 13 of a track shape in plan, and flanges 14 provided on both sides thereof. The central portion 13a of the upper surface of the retainer part 13 is formed such as to be flat, as shown in FIGS. 6(c) and 6(e), while both side portions 13b, 13b of the upper surface of the retainer part 13 are downwardly slanted toward the outside thereof. Further, an opening 15 is formed in the portion of the retainer part 13 which corresponds to the loaded ball rolling groove 12a.

Figure 6A:
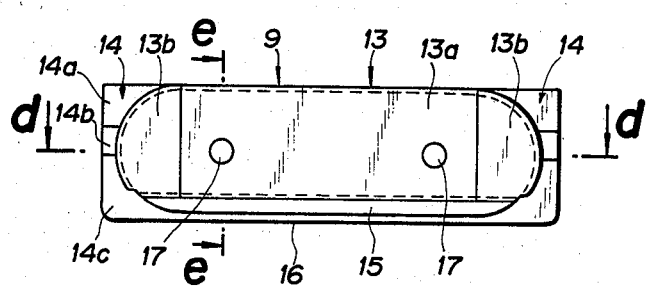
FIG. 6(a) is a plan view of a ball retainer of one bearing unit.
Figure 6B:
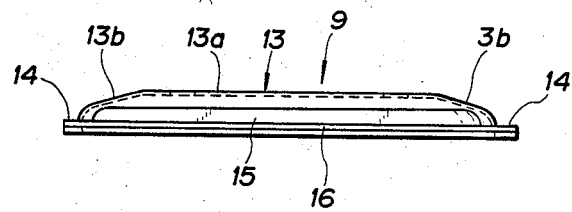
FIG. 6(b) is a front elevational view of the ball retainer shown in FIG. 6(a)
Figure 6C:
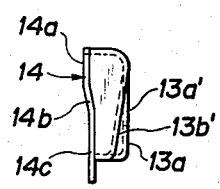
FIG. 6(c) is a side elevational view of the ball retainer shown in FIG. 6(a)
Figure 6D:
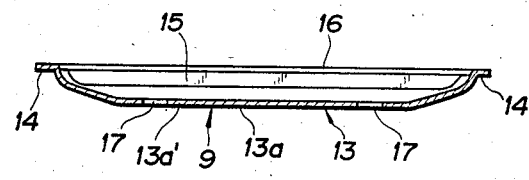
FIG. 6(d) is a sectional view taken along the line d—d of FIG. 6(a)
Figure 6E:
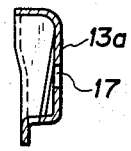
FIG. 6(e) is a sectional view taken along the line e—e of FIG. 6(a)

Each of the flanges 14 is, as shown in FIG. 6(c), composed of, from the inner side toward the outer side thereof, a lower portion 14a which abuts against the higher portion 10a of the recess 10, a slanted portion 14b, and a higher portion 14c, which are formed by bending the flange 14. Further, the respective higher portions 14c, 14c of the flanges 14 are integrally connected by means of a guide rod 16 which serves to prevent the loaded balls 7, 7 . . . from coming off.

The ball retainer 9 is secured to the upper surface of the ridge 11 of the bearing body 8 by means of screws 18, 18 which are respectively screwed into screw holes 19, 19 formed in the upper surface of the ridge 11 through through-holes 17, 17 bored in the intermediate portion 13a of the retainer part 13. Thus, the loaded balls 7, 7 . . . which recirculate through the endless ball rolling passage 12 are retained by the ball retainer 9 as shown in FIGS. 3 and 7 to 9.

Each of the bearing units 6a, 6b, 6c, 6d constructed as described above is secured to the connecting plate L by means of screws 21, 21, . . . which are respectively received through screw holes 20, 20, 20 formed in the associated bearing body 8. Thus, the loaded balls 7, 7 . . . fitted in the adjacent outer side surfaces of each of the bearing units 6a, 6b, 6c, 6d are adapted, as they roll along the loaded ball rolling groove 12a of each ridge 11, to roll along the loaded ball rolling grooves 4, 4 . . . of the pairs of track rails 1, 1, 2, 2, which are disposed such as to cross each other at right angles in inverted relation to each other. For this arrangement, each of the loaded ball rolling grooves 4, 4 . . . is provided with a recess 22 for receiving the guide rod 16 of the corresponding ball retainer 9 as will be clearly seen in FIG. 9.

The cross-linear slide bearing of the present invention, constructed as described above, is mounted such that the lower pair of track rails 1, 1 are attached to, for example, a work table and the upper pair of track rails 2, 2 are attached to, for example, an X-Y table to which is mounted an object to be slid, such as a machine tool. Thus, the cross-linear slide bearing is capable of linearly sliding the object in the forward and backward as well as rightward and leftward directions, and it becomes possible to effect accurate positioning of the object.

What is claimed is:

1. A cross-linear slide bearing having a reduced thickness for use in an X-Y table comprising:
    a pair of first track rails which are disposed on a securing part such as to be in parallel to each other and are respectively provided in the opposing inner surfaces thereof with loaded ball rolling grooves extending longitudinally;
    a pair of second track rails which are attached to a movable table such as to be in parallel to each other and to cross said first track rails at right angles and are provided in the opposing inner surfaces thereof with loaded ball rolling grooves extending longitudinally; and
    four bearing units which are respectively disposed at intersections between said first and second track rails and are adapted to linearly move relative to the corresponding track rails,
    wherein each of said bearing units is composed of: a flat bearing body having a pair of outer side surfaces which are adjacent to each other at 90 degrees, said bearing body having first and second loaded ball rolling grooves which are respectively formed in said outer side surfaces such as to face the corresponding loaded ball rolling grooves on said first and second track rails and such as to be separate from each other vertically, said bearing body further having a non-loaded ball rolling groove which is provided horizontally inward of each of said first and second loaded ball rolling grooves and is connected to the corresponding loaded ball rolling groove, thereby forming an endless ball rolling passage for recirculating balls; a multiplicity of balls disposed within said endless ball rolling passage; and a ball retainer which is attached to said bearing body and is adapted to rollably retain the balls within said loaded ball rolling groove.

2. A cross-linear slide bearing having a reduced thickness for use in an X-Y table according to claim 1, wherein said bearing body is provided on the upper and lower surfaces thereof with two recesses which respectively extend along the adjacent outer side surfaces thereof in directions orthogonal to each other, each recess being integrally provided therein with a ridge of a substantially track shape in plan which projects from the bottom surface thereof, said ridge being formed on the outer periphery thereof with said endless ball rolling passage through which said balls recirculate while rolling.

3. A cross-linear slide bearing having a reduced thickness for use in an X-Y table according to claim 2, wherein each of said recesses is formed on the bottom surface thereof with a higher portion, a slanted portion and a lower portion, from the inner side toward the outer side thereof.

4. A cross-linear slide bearing having a reduced thickness for use in an X-Y table according to claim 3, wherein said ball retainer includes a dome-like retainer part of a track shape in plan, and flanges formed on both sides of said retainer part, said retainer part being formed such that the central portion of the upper surface thereof is flat and both side portions thereof are slanted downwardly toward the outside thereof, and said retainer part being provided with an opening at a portion thereof which corresponds to said loaded ball rolling groove.

5. A cross-linear slide bearing having a reduced thickness for use in an X-Y table according to claim 4, wherein each of said flanges on both sides of said ball retainer is composed of a lower portion which abuts against the higher portion of said recess, a slanted portion, and a higher portion, which are formed by bending said flange, and the respective higher portions of said flanges are integrally connected by means of a guide rod which serves to prevent said balls from coming off.

* * * * *